N. WEBB & D. F. BEVERIDGE.
Grappling-Iron.
No. 211,120. Patented Jan. 7, 1879.
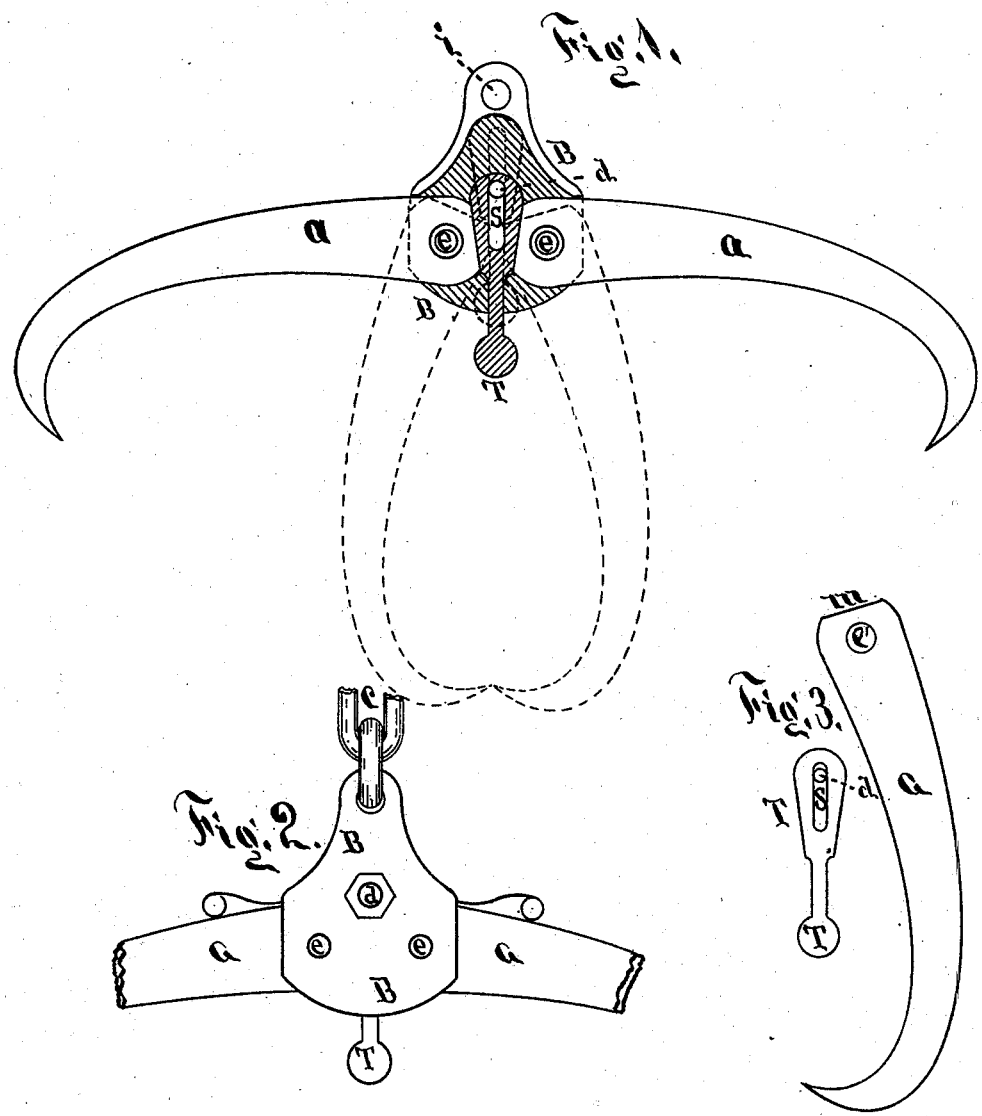

UNITED STATES PATENT OFFICE.

NATHAN WEBB AND DAVID F. BEVERIDGE, OF SACRAMENTO, CALIFORNIA; SAID BEVERIDGE ASSIGNOR TO SAID WEBB.

IMPROVEMENT IN GRAPPLING-IRONS.

Specification forming part of Letters Patent No. 211,120, dated January 7, 1879; application filed June 14, 1878.

*To all whom it may concern:*

Be it known that we, NATHAN WEBB and DAVID FORNEY BEVERIDGE, of the city of Sacramento, State of California, have invented a new and useful Improvement in Grappling-Irons, of which the following is a specification:

The invention relates to that class of grappling-irons or tongs used for wrecking purposes, and for grappling and raising bodies, where their location is known; and consists of the combination of two or more hooks, so arranged that they will remain spread or opened until the grapple comes in contact with the body to be raised, when the hooks are let loose, and fall so as to grapple the said body.

In the accompanying drawings, Figure 1 shows a sectional elevation of the grappling-hook embodying our invention. Fig. 2 shows an elevation of the same, with the points of the hook cut off. Fig. 3 shows details of the same.

In Fig. 1 the grapple is shown with the hooks $a$ set open or extending outward, and the trip T dropped down, so that by its taper sides it wedges between the joints of $a\ a$, and against the flat sides of the periphery of the joints, as shown by letter $m$, (see Fig. 3,) so as to prevent the hooks $a$ from dropping down.

It will be seen that the shape of the trip T presents a wedge form between the joints of $a$ and $a$, so that when the trip T is down and in contact with the flats $m$ the hooks are held up, as shown; but when any object presses against the trip T, which is the case when the grapple is lowered down upon an object then the trip T is forced up, as shown in dotted lines, (see Fig. 1,) and its wedge-like sides are forced from between the joints of $a\ a$, thus allowing the hooks to drop or come together, as shown in dotted lines, thus causing said hooks to grapple the object or body that touches the trip T.

In this drawing a two-hooked grapple is shown; but in practice two or more hooks can be used on the same plan by forming the trip T with a taper side for each hook, it being preferable to have two hooks and the trip T made flat, or have four hooks and have the trip made square, or formed with all sides alike.

In practice we depend upon the weight of the hooks $a$ to cause them to drop together, for when in use the position of the grapple is the same as shown in drawings, on account of being suspended by means of a rope or chain connected to the eye $i$. (See Fig. 2, chain C.)

In construction, the trip T is provided with a longitudinal slot, S, that fits over the pin $d$; and also said pin acts as a guide for T, and for the purpose of securing the cap B' on B, which it does by means of the nut N, which screws on $d$ and holds B' in place.

Fig. 2 shows an elevation of the grapple, composed of the case B, that incloses the upper part of the trip T and the joints of the arms or hooks $a\ a$, shown with their hooked points broken off.

We do not confine ourselves to any particular form of hooks, for the reason that different purposes require different-shaped hooks.

In this drawing there are shown two springs, $v\ v$, which are fastened to the inside of B, and made to press downward on the arms or hooks $a\ a$, for the purpose of throwing them down with force, which may be required in certain cases.

Fig. 3 shows details of the grapple, showing the hook $a$, with pivot-eye $i$ and flat $m$, also the trip T, with slot S and taper $w$.

What we claim as our invention is—

The combination of the case B, cap B', and pins $e\ e$ and $d$ with the trip T and arms or hooks $a\ a$, substantially as and for the purposes above set forth.

NATHAN WEBB.
DAVID FORNEY BEVERIDGE.

Witnesses:
NOBLE FISHER,
C. WEEKS.